June 17, 1958

E. B. KNOTT 2,839,403

MEROCYANINE DYES AND PHOTOGRAPHIC
EMULSIONS CONTAINING THEM

Filed Aug. 30, 1955

Fig. 1

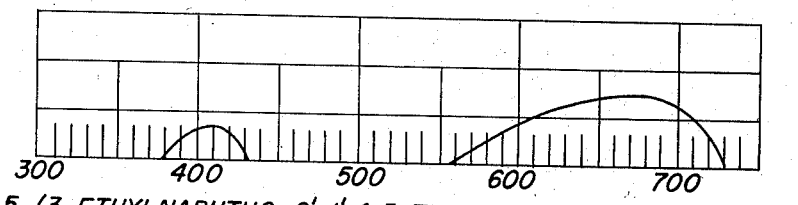

5-(3-ETHYLNAPHTHO-2',1'-4,5-THIAZOLIN-2-YLIDENE-BUTA-2",4"-DIENYLIDENE)-1-n-HEPTYL-3-(2-PYRIDYL)
2-THIOHYDANTOIN

Fig. 2

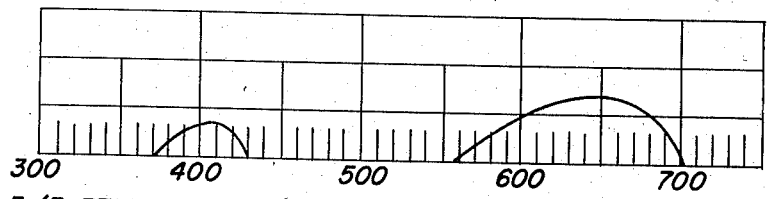

5-(3-ETHYLBENZOTHIAZOLIN-2-YLIDENE-BUTA-2',4'-DIENYLIDENE)-1-n-HEPTYL-3-(2-PYRIDYL)-2-THIOHYDANTOIN

Fig. 3

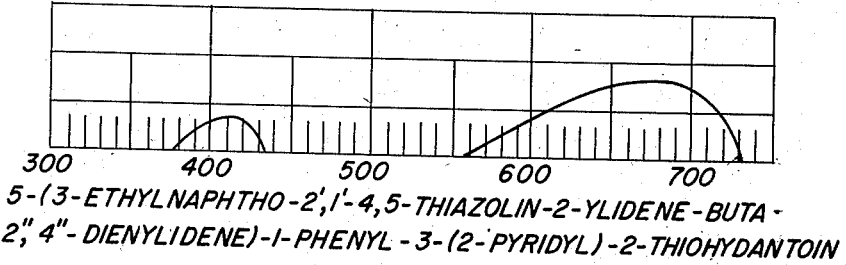

5-(3-ETHYLNAPHTHO-2',1'-4,5-THIAZOLIN-2-YLIDENE-BUTA-2",4"-DIENYLIDENE)-1-PHENYL-3-(2-PYRIDYL)-2-THIOHYDANTOIN

EDWARD B. KNOTT
INVENTOR.

BY *Daniel I. Mayne*

*Lawrence H. Willis*

ATTORNEYS

United States Patent Office 2,839,403
Patented June 17, 1958

2,839,403
MEROCYANINE DYES AND PHOTOGRAPHIC EMULSIONS CONTAINING THEM

Edward B. Knott, Harrow, England, assignor to Eastman Kodak Company, Rochester, N. Y., a corporation of New Jersey Application August 30, 1955, Serial No. 531,385

12 Claims. (Cl. 96—105)

This invention relates to new merocyanine dyes and photographic silver halide emulsions sensitized therewith. More particularly, this invention relates to new merocyanine dyes containing a 2-thiohydantoin nucleus, having on at least one of the nitrogen atoms thereof a pyridyl or a quinolyl substituent.

Accordingly, it is an object of my invention to provide new merocyanine dyes containing a 2-thiohydantoin nucleus. Another object is to provide methods for making these new merocyanine dyes. Still another object is to provide photographic silver halide emulsions sensitized with these new merocyanine dyes. Another object is to provide new intermediates useful in preparing these merocyanine dyes and methods for making these new intermediates. Other objects will become apparent from a consideration of the following description and examples.

The new merocyanine dyes of my invention can advantageously be represented by the following general formula:

I.

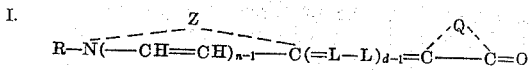

wherein R represents an alkyl group, such as methyl, ethyl, n-propyl, isopropyl, n-butyl, isobutyl, n-amyl, carboxymethyl, β-carboxyethyl, carbomethoxymethyl, carbethoxymethyl, β-hydroxyethyl, β-methoxyethyl, allyl (vinylmethyl), benzyl (phenylmethyl), etc. (e. g., an alkyl group of the formula $C_mH_{2m+1}$ wherein $m$ represents a positive integer of from 1 to 4), $d$ represents a positive integer of from 1 to 3, $n$ represents a positive integer of from 1 to 2, L represents a methine group (i. e., a —CR′= group wherein R′ is a hydrogen atom or a monovalent organic substituent, such as methyl, ethyl, methoxyl, ethoxyl, etc.), Q represents the non-metallic atoms necessary to complete a heterocyclic nucleus of the 2-thiohydantoin series, said heterocyclic nucleus having a pyridyl or quinolyl substituent (e. g., 2-pyridyl, 3-pyridyl, 4-pyridyl, 6-methyl-2-pyridyl, 4-methyl-2-pyridyl, 3-quinolyl, etc.) attached to at least one of the nitrogen atoms thereof, and Z represents the nonmetallic atoms necessary to complete a heterocyclic nucleus containing from 5 to 6 atoms in the heterocyclic ring, such as those selected from the group consisting of those of the thiazole series (e. g., thiazole, 4-methylthiazole, 5-methylthiazole, 4-phenylthiazole, 5-phenylthiazole, 4,5-dimethylthiazole, 4,5-diphenylthiazole, 4-(2-thienyl)thiazole, etc.), those of the benzthiazole series (e. g., benzthiazole, 4-chlorobenzthiazole, 5-chlorobenzthiazole, 6-chlorobenzthiazole, 7-chlorobenzthiazole, 4-methylbenzthiazole, 5-methylbenzthiazole, 6-methylbenzthiazole, 5-bromobenzthiazole, 6-bromobenzthiazole, 4-phenylbenzthiazole, 5-phenylbenzthiazole, 4-methoxybenzthiazole, 5-methoxybenzthiazole, 6-methoxybenzthiazole, 5-iodobenzthiazole, 6-iodobenzthiazole, 4-ethoxybenzthiazole, 5-ethoxybenzthiazole, tetrahydrobenzthiazole, 5,6-dimethoxybenzthiazole, 5,6-dioxymethylenebenzthiazole, 5-hydroxybenzthiazole, 6-hydroxybenzthiazole, etc.), those of the naphthothiazole series (e. g., α-naphthothiazole (i. e., [2,1]-naphthothiazole), β-naphthothiazole (i. e., [1,2]-naphthothiazole), 5-methoxy-β-naphthothiazole, 5-ethoxy-β-naphthothiazole, 7-methoxy-α-naphthothiazole, 8-methoxy-α-naphthothiazole, etc.), those of the thianaphtheno-7′,6′,4,5-thiazole series (e. g., 4′-methoxythianaphtheno-7′,6′,4,5-thiazole, etc.), those of the oxazole series (e. g., 4-methyloxazole, 5-methyloxazole, 4-phenyloxazole, 4,5-diphenyloxazole, 4-ethyloxazole, 4,5-dimethyloxazole, 5-phenyloxazole, etc.), those of the benzoxazole series (e. g., benzoxazole, 5-chlorobenzoxazole, 5-phenylbenzoxazole, 5-methylbenzoxazole, 6-methylbenzoxazole, 5,6-dimethylbenzoxazole, 4,6-dimethylbenzoxazole, 5-methoxybenzoxazole, 6-methoxybenzoxazole, 5-ethoxybenzoxazole, 6-chlorobenzoxazole, 5-hydroxybenzoxazole, 6-hydroxybenzoxazole, etc.), those of the naphthoxazole series (e. g., α-naphthoxazole, β-naphthoxazole, etc.), those of the selenazole series (e. g., 4-methylselenazole, 4-phenylselenazole, etc.), those of the benzselenazole series (e. g., benzselenazole, 5-chlorobenzselenazole, 5 - methoxybenzselenazole, 5 - hydroxybenzselenazole, tetrahydrobenzselenazole, etc.), those of the naphthoselenazole series (e. g., α-naphthoselenazole, β-naphthoselenazole, etc.), those of the thiazoline series (e. g., thiazoline, 4-methylthiazoline, etc.), those of the 2-quinoline series (e. g., quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), those of the 4-quinoline series (e. g., quinoline, 6-methoxyquinoline, 7-methylquinoline, 8-methylquinoline, etc.), those of the 1-isoquinoline series (e. g., isoquinoline, 3,4-dihydroisoquinoline, etc.), those of the 3,3-dialkylindolenine series (e. g., 3,3-dimethylindolenine, 3,3,5-trimethylindolenine, 3,3,7-trimethylindolenine, etc.), those of the 2-pyridine series (e. g., pyridine, 3-methylpyridine, 4-methylpyridine, 5-methylpyridine, 6-methylpyridine, 3,4-dimethylpyridine, 3,5-dimethylpyridine, 3,6-dimethylpyridine, 4,5-dimethylpyridine, 4,6-dimethylpyridine, 4-chloropyridine, 5-chloropyridine, 6-chloropyridine, 3-hydroxypyridine, 4-hydroxypyridine, 5-hydroxypyridine, 6-hydroxypyridine, 3-phenylpyridine, 4-phenylpyridine, 6-phenylpyridine, etc.), those of the 4-pyridine series (e. g., 2-methylpyridine, 3-methylpyridine, 2-chloropyridine, 3-chloropyridine, 2,3-dimethylpyridine, 2,5-dimethylpyridine, 2,6-dimethylpyridine, 2-hydroxypyridine, 3-hydroxypyridine, etc.), etc.

According to my invention, I provide the new dyes represented by Formula I above wherein $d$ represents 1 by reacting together a cyclammonium quaternary salt selected from those represented by the following general formula:

II.

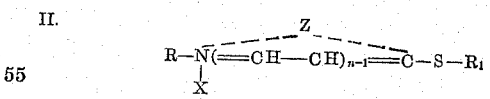

wherein R, $n$, and Z each have the values given above, $R_1$ represents an alkyl group (e. g., methyl, ethyl, etc.) or an aryl group (e. g., phenyl, o-, m-, and p-tolyl, etc.), and X represents an acid anion, e. g., chloride, bromide, iodide, thiocyanate, sulphamate, methylsulphate, ethylsulphate, perchlorate, benzenesulphonate, p-toluenesulphonate, etc., with a compound selected from those represented by the following general formula:

III.

wherein Q has the values given above.

The new dyes of my invention represented by Formula I above wherein $d$ represents 2 or 3 can be prepared by condensing a cyclammonium quaternary salt selected from those represented by the following general formula:

IV. 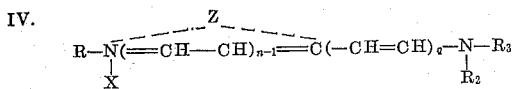

wherein R, n, X, and Z each have the values given above, q represents a positive integer of from 1 to 2, $R_2$ represents an acyl group (e. g., acetyl, propionyl, benzoyl, etc.), and $R_3$ represents an aryl group (e. g., phenyl, o-, m-, p-tolyl), together with a compound selected from those represented by Formula III.

The condensations of the compounds of Formula III with those of Formulas II (or IV) can advantageously be accelerated by heating the reaction mixture, generally temperatures varying from ambient temperature (ca. 20° C.) to the reflux temperature of the reaction mixture being satisfactory. The condensations can be carried out in the presence of an inert solvent, such as pyridine, nitrobenzene, ethanol, n-propanol, isopropanol, n-butanol, etc.

The condensations of the compounds of Formula III with those of Formulas II (or IV) can advantageously be carried out in the presence of a basic condensing agent, such as the trialkylamines (e. g., triethylamine, tri-n-propylamine, triisopropylamine, tri-n-butylamine, triisobutylamine, tri-n-amylamine, etc.), N-alkylpiperidines (e. g., N-methylpiperidine, N-ethylpiperidine, etc.), N,N-dialkylanilines (e. g., N, N-dimethylaniline, diethylaniline, etc.), etc.

Particularly useful merocyanine dyes selected from those represented by Formula I above comprise those dyes represented by the following general formula:

V. 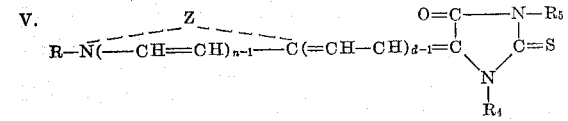

wherein R, n, d, and Z have the values given above, $R_4$ and $R_5$ each represents an alkyl group, such as methyl, ethyl, n-propyl, n-butyl, n-amyl, n-hexyl, n-heptyl, benzyl (phenylmethyl), allyl (vinylmethyl), cyclopentyl, cyclohexyl, etc. (e. g., an unsubstituted or a subsituted alkyl group, especially those containing from 1 to 7 carbon atoms), or an aryl group, such as phenyl, o-, m-, and p-tolyl, etc. (e. g., a mononuclear aromatic group of the benzene series), provided at least one of the groups selected from $R_4$ and $R_5$ is a pyridyl or quinolyl group as defined above.

The preparation of the compounds represented by Formula V above requires, in addition to the compounds represented by Formulas II and IV above, an intermediate selected from those represented by the following general formula:

VI. 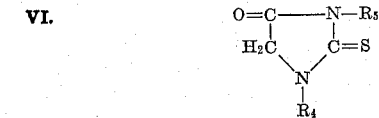

wherein $R_4$ and $R_5$ each have the values given above.

The compounds represented by Formula VI above can advantageously be prepared by heating together a compound selected from those represented by the following general formulae:

VII. 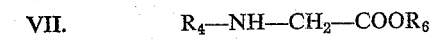 $R_4$—NH—$CH_2$—$COOR_6$

VIIa.  $R_4$—NH—$CH_2$CN wherein $R_4$ has the values given above and $R_6$ represents a lower alkyl group, such as methyl, ethyl, etc., together with a compound selected from those represented by the following two general formulae:

VIII. $R_5$—NCS and

IX. $R_5$—NH—$CSSR_7$ wherein $R_5$ has the values given above and $R_7$ represents a lower alkyl group, such as methyl, ethyl, etc. The condensation of the compounds of Formula VII with either those of Formula VIII or IX can be carried out at temperatures of about 150–190° C., or even higher temperatures. The condensation of the compounds of Formula VIIa with either those of Formula VIII or IX can be carried out on a steam bath or at even higher temperatures and the product first obtained is an iminothiohydantoin which must then be hydrolysed by treatment with mineral acid to give the thiohydantoin. The preparation of the compounds of III (or VI) follows the method outlined by Wheeler et al.—"J. A. C. S." (1911), vol. 46, pages 456–474, except that heterocyclic intermediates are employed in place of the acyclic or aromatic dithiocarbamates employed by Wheeler et al.

The compounds represented by Formula I (or V) wherein R represents a substituted alkyl group can advantageously be prepared by condensing a compound represented by the following general formula:

X. 

wherein R, X, Z and n each have the values given above with one of the intermediates represented by Formula I in U. S. Patent 2,186,608, page 1, column 1, line 42. (D and E of patent being identical to the Q above.)

The following examples will serve to illustrate the manner of preparing the new merocyanine dyes of my invention, as well as the preparation of the new 2-thiohydantoin intermediates necessary for preparing these new merocyanine dyes.

*Example 1.—Ethyl N-(2-pyridyl)glycine*

N-(2-pyridyl)aminoacetonitrile (Bristow, Charlton, Peak and Short, J. Chem. Soc., 1954, 616) (160 g.) was added to a solution of concentrated sulphuric acid (160 cc.) in 99% ethanol (800 cc.). The whole was then refluxed for 3 hours on a steam bath and poured on to crushed ice (2 kg.). Solid sodium bicarbonate was added to neutralize the acid and the thick oil which separated was taken up in ether, the ethereal solution was dried over anhydrous potassium carbonate and the ether distilled off. The residual oil was distilled and collected at 156–168° C./14 mm. Yield 117 g., 54%. On prolonged chilling at −5° C. it slowly solidified to long asbestos-like needles.

*Example 2.—3-ethyl-1-(2-pyridyl)-2-thiohydantoin*

Ethyl N-(2-pyridyl)glycine (18.0 g., 0.1 mol.) and ethylisothiocyanate (8.8 cc.; 0.1 mol.) were fused together in an oil bath at 150° C. for 3 hours. The whole solidified on chilling. From isopropanol it formed greenish flakes, M. P. 106° C., in 74% yield. Recrystallized from cyclohexane, a sample, formed almost colorless flakes, M. P. 107° C.

*Example 3.—3-n-heptyl-1-(2-pyridyl)-2-thiohydantoin*

Ethyl N-(2-pyridyl)glycine (9.0 g.), and n-heptylisothiocyanate (7.85 g.) were fused together at 150° C. for 7 hours. The whole crystallized on chilling. It was dissolved in hot ethanol (5 cc.) chilled and seeded. It (70% yield) formed colorless flakes, M. P. 70° C., from ethanol.

*Example 4.—3-methyl-1-(2-pyridyl)-2-thiohydantoin*

Ethyl-N-(2-pyridyl)glycine (25.1 g.) and methylisothiocyanate (10 g.) were fused together at 150° C. for 7 hours. The whole solidified on chilling. It was boiled up with ethanol, chilled and collected. Yield 13.3 g., 47%. A sample from ethanol formed soft, white needles, M. P. 141° C.

*Example 5.—3-phenyl-1-(2-pyridyl)-2-thiohydantoin*

Ethyl - N-(2-pyridyl)glycine (13.6 g.) and phenylisothiocyanate (10 g.) were fused together at 150° C. for 3 hours. The whole solidified after 1½ hours. From acetic acid it formed black needles, M. P. 186° C.

*Example 6.—3-cyclohexyl-1-(2-pyridyl)-2-thiohydantoin*

Ethyl-N-(2-pyridyl)glycine (13 g.) and cyclohexylisothiocyanate (10 g.) were fused together at 150° C. for 7 hours. The whole solidified on chilling. It (7.8 g., 40%) formed soft white needles, M. P. 174° C., from ethanol.

*Example 7.—3-benzyl-1-(2-pyridyl)-2-thiohydantoin*

Ethyl N-(2-pyridyl)glycine (8 g.) and ethyl N-benzyl-dithiocarbamate (10.5 g.) were fused together at 150° C. for 5 hours. Ethanol (10 cc.) was added to the melt. On chilling the thiohydantoin separated as an oil, then it solidified. It (9.0 g., 63.5%) formed greenish flakes, M. P. 115° C., from ethyl acetate-methanol, then from methanol.

*Example 8.—3-allyl-1-(2-pyridyl)-2-thiohydantoin*

Ethyl-N-(2-pyridyl)glycine (18.6 g.) and allylisothiocyanate (10 g.) were fused together at 150° C., for 2 hours. The thick melt was diluted with isopropanol (5 cc.) chilled and scratched. The required substance crystallized, was collected and washed with ice-cold isopropanol. It (4.7 g., 36%) formed straw colored needles, M. P. 62° C., from methanol.

*Example 9.—Ethyl N - (6 - methyl-2-pyridyl)glycine*

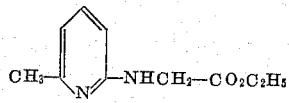

The method for making the precursor of this compound follows the procedure of Bristow et al. (loc. cit.). A mixture of formalin (24 cc.), sodium bisulphite (31.2 g.) and water (60 cc.) was stirred for 30 minutes to dissolve, the temperature rising to 40° C. The solution was then heated to 95° C. and 6-methyl-2-amino-pyridine (32.8 g.) was added and the stirring at 95° C. continued for 1 hour. A solution of sodium cyanide (30 g.) in water (60 cc.) was run in over 10 minutes and the heating and stirring continued for 4 hours. The solution and separated salt were cooled, the salt was filtered off and the filtrate extracted with chloroform. The chloroform solution was dried and the solvent distilled to leave a brown oil which solidified on chilling. It (28.2 g.) was added to a cooled solution of concentrated sulphuric acid (24 cc.) in ethanol (120 cc.) and the solution was refluxed for 3 hours on a steam bath. The solution was cooled and poured into ice water (300 cc.). Solid sodium bicarbonate was added to neutralize the acid and the brown oil was taken up in ether. The dried ethereal solution was distilled and the required ester (28.0 g., 48% based on amine) collected at 158–162° C./12 mm.

*Example 10.—3 - ethyl - 1 - (6-methyl-2-pyridyl)-2-thiohydantoin*

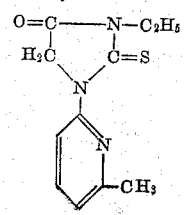

Ethyl N - (6 - methyl-2-pyridyl)glycine (10 g.) and ethylisothiocyanate (4.5 cc.) were fused together at 150–155° C. for 6 hours. Methanol (10 cc.) was added and the whole chilled. The buff grains (3.0 g., 25.5%) formed white needles M. P. ca. 85° C. from isopropanol.

*Example 11.—Triethylammonium N - (2-pyridyl)dithiocarbamate*

2-aminopyridine (18.8 g., 0.2 mol.), carbon disulphide (12 cc., 0.2 mol.) and triethylamine (30 cc., 0.2 mol.) were warmed on a steam bath to give a homogeneous layer. After a few minutes it separated into two layers. The flask, fitted with a short air condenser, was then shaken, without further heating, on a mechanical shaker. The lower, orange layer gradually thickened as the upper, almost colorless layer gradually disappeared. After ca. 1½ hours (this time varies with the shape of the flask, violence of agitation and batch size) the whole suddenly solidified. The reaction was slightly exothermic. The contents of the flask were ground to a powder, washed with ether, and collected. Yield 49.0 g. (90.5%) of bright yellow crystals. A sample from ethanol formed lemon yellow plates, M. P. 84–85° C. (decomp. to 2-aminopyridine, carbon disulphide and triethylamine).

*Example 12.—Methyl N-(2-pyridyl)dithiocarbamate*

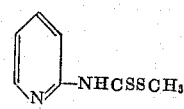

The above salt of Example 11 (54.2 g.) was covered with ethanol (150 cc.) and methyl iodide (13 cc.) was added. A slightly exothermic reaction followed as the salt gradually dissolved. The solution was stood for 1 hour. The required ester had partly crystallized and this was completed by the gradual addition of water. After chilling overnight, the crystals were collected, washed with water, air dried and recrystallized from benzene-light petroleum. They (27 g., 73.5%) formed lemon spears, M. P. 91° C., after a second recrystallization from ethanol.

*Example 13.—Ethyl N-(2-pyridyl)dithiocarbamate*

Triethylammonium N - (2 - pyridyl)dithiocarbamate (54.2 g.) was covered with ethanol (150 cc.) and ethyl bromide (16 cc.) was added and the whole warmed to 50° C. The solid dissolved and the solution was set aside for 1 hour. Water (250 cc.) was run in and the oil which precipitated slowly solidified. It was collected and washed with aqueous ethanol (1:1). It (28 g., 71%) formed fine, lemon yellow needles after recrystallization from cyclohexane, then from ethanol, M. P. 64° C.

*Example 14.—1-phenyl-3-(2-pyridyl)-2-thiohydantoin*

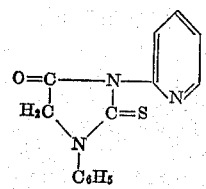

Ethyl N-phenylaminoacetate (10 g.) and methyl N-(2-pyridyl)dithiocarbamate (10.2 g.) were fused together at 145–150° C. for 20 minutes. The whole had then solidified. It was dissolved in ethanol (500 cc.) and chilled. It (7.0 g., 47%) formed soft, cream needles, M. P. 190° C., after one further recrystallization from ethanol.

*Example 15.—1-n-heptyl-3-(2-pyridyl)-2-thiohydantoin*

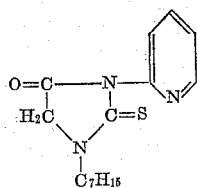

Ethyl N-(2-pyridyl)dithiocarbamate (9.9 g.) and ethyl N-n-heptylaminoacetate (10.05 g.) were fused together at 145–150° C. for 3 hours. The orange tar partly crystallized on prolonged chilling and the crude substance was used for dye condensations.

*Example 16.—1,3-di-(2-pyridyl)-2-thiohydantoin*

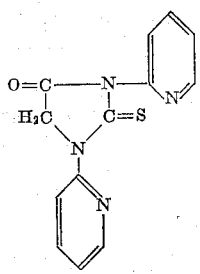

Ethyl N-(2-pyridyl)aminoacetate (9.0 g.) and methyl N-(2-pyridyl)dithiocarbamate (9.2 g.) were fused together at 140–145° C. for 2 hours. Ethanol (10 cc.) was added to the hot melt. The required substance crystallized on cooling. It (9.0 g., 67%) formed soft, buff needles, M. P. 173° C., from ethanol.

*Example 17.—Triethylammonium N-(3-pyridyl)dithiocarbamate*

3-aminopyridine (5.0 g.), carbon sulphide (3.2 cc.) and triethylamine (8 cc.) were warmed to melt and shaken mechanically for 6 hours. Reaction was rapid to give a cake of crystals. The surface liquor was decanted and the crystals washed with ether. They were then dissolved in hot ethanol (10 cc.) and ether was added to give a crystalline meal. The salt (6.1 g., 42.5%) formed yellow prisms M. P. 87° C. (effervescence), from ethanol-ether.

*Example 18.—Methyl N-(3-pyridyl)dithiocarbamate*

Triethylammonium N - (3 - pyridyl)dithiocarbamate (6.1 g.), ethanol (25 cc.) and methyl iodide (1.5 cc.) were mixed and shaken. The solid dissolved with a mildly exothermic reaction. After 15 minutes, water was added slowly to give a solid cake of white needles. It (97.5%) formed glossy white flakes, M. P. 135–136° C., from benzene. On fusing at 145° C./10 mm. methanethiol was evolved and 3-pyridyl isothiocyanate distilled. Colorless oil, b. p. 104° C./14 mm., 228°C./765 mm. This can be used instead of its precursor in the formation of thiohydantoins.

*Example 19.—Triethylammonium N-(6-methyl-2-pyridyl) dithiocarbamate*

2-amino-6-methylpyridine (21.6 g.), triethylamine (30 cc.) and carbon sulphide (15 cc.) were warmed to give a single phase and then shaken mechanically for 20 hours. A second phase separated after 50 minutes. The solid cake of crystals was ground under ether and vacuum dried. The salt (48.5 g., 85%) formed yellow aggregates, M. P. 76° C., from methanol-ether.

*Example 20.—Methyl N-(6-methyl-2-pyridyl)dithiocarbamate*

Proceeding as in Example 19, the solid cake of salt was ground to a powder, suspended in ethanol (100 cc.) and treated with methyl iodide. The flask and contents were shaken until the salt had dissolved and set aside for 1 hour. Water was then added to give the required crystalline ester. It was collected, washed with water then with light petroleum. It (28.0 g., 71%) formed pale yellow plates, M. P. 89–90° C., from methanol.

*Example 21.—Triethylammonium N-(4-methyl-2-pyridyl) dithiocarbamate*

Prepared as for Example 19, the required salt only crystallized after dissolving the thick orange oil resulting from the reaction, in a little methanol and running in ether. It formed orange flakes, M. P. 75–76° C.

*Example 22.—Methyl N-(4-methyl-2-pyridyl)dithiocarbamate*

Proceeding as in Example 21, the crude orange tar of the triethylammonium salt was dissolved in methanol (100 cc.) and treated with methyl iodide (30 cc.). After 1 hour, water was run in to give a mass of crystals. The ester (75.6 g., 76%) formed pale yellow needles, M. P. 101–102° C., from methanol.

*Example 23.—Triethylammonium N-(3-quinolyl)dithiocarbamate*

3-aminoquinoline (5.0 g.) was dissolved in dioxan (10 cc.) carbon disulphide (2.2 cc.) and triethylamine (5.5 cc.) were added and the solution kept at 20–25° C. for 20 hours. A solid cake of yellow crystals had then separated. It was ground under ether and collected. It (97% yield) formed pale yellow prisms, M. P. 89° C. (dec.) from ethanol-ether.

*Example 24.—Methyl N-(3-quinolyl)dithiocarbamate*

Triethylammonium N - (3 - quinolyl)dithiocarbamate (10.5 g.) was covered with methanol (35 cc.) and methyl iodide (2.1 cc.) was added. On shaking the flask, the salt dissolved and the ester separated as white needles, the whole solidifying. It (6.95 g., 87%) formed pale yellow needles, M. P. 137–138° C., from ethanol.

*Example 25.—1-ethyl-3-(2-pyridyl)-2-thiohydantoin*

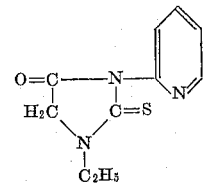

Ethylaminoacetonitrile (4.2 g.) and methyl N-(2-pyridyl)-dithiocarbamate (9.2 g.) were heated together on a steam bath for 1 hour. The orange tar was dissolved in 5N-hydrochloric acid by heating on a steam bath for 1 hour. The solution was diluted with water (100 cc.) and basified with ammonia. The resulting orange grains (10.2 g.) were slurried in ethanol, collected and washed with ethanol. They (5.6 g.) were dissolved in boiling benzene (50 cc.), the solution was chilled overnight and the white crystals filtered off and discarded. The filtrate was then concentrated to 20 cc. and the required substance precipitated by the addition of light petroleum (60 cc.). The required thiohydantoin (2.2 g., 20%) formed fawn needles, M. P. 132° C., from benzene.

*Example 26.—1-(2-pyridyl)-3-(3-pyridyl)-2-thiohydantoin*

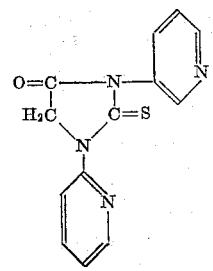

Ethyl N-(2-pyridyl)glycine (9.0 g.) and methyl N-(3-pyridyl)dithiocarbamate (9.2 g.) were fused together at 140° C. for 2 hours. The solid reaction product was ground under ethanol. It (9.8 g., 72.5%) formed soft, light brown needles, M. P. 170–171° C., from ethanol.

*Example 27.—1-(2-pyridyl)-3-(6 - methyl-2 - pyridyl)-2-thiohydantoin*

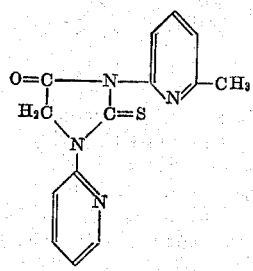

Ethyl N-(2-pyridyl)glycine (9.7 g.) and methyl N-(6-methyl-2-pyridyl)dithiocarbamate (10.7 g.) were fused together at 140° C. for 2 hours. Ethanol (10 cc.) was added to the melt and the solution was chilled to crystallize. It (10.4 g., 73%) formed almost colorless needles, M. P. 146–147° C., from ethanol.

*Example 28.—1-(2-pyridyl)-3-(4 - methyl-2 - pyridyl)-2-thiohydantoin*

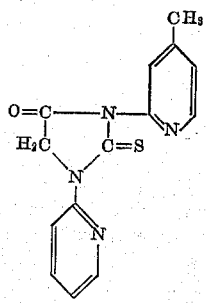

This compound was prepared in a similar way to that of Example 27 in 57% yield. It formed buff needles, M. P. 151° C., from ethanol.

*Example 29.—1-(2-pyridyl)-3-(3-quinolyl)-2-thiohydantoin*

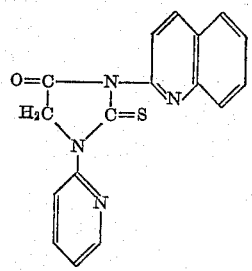

Ethyl N-(2-pyridyl)glycine (4.5 g.) and methyl N-(3-quinolyl)dithiocarbamate (5.85 g.) were fused together at 150° C. for 30 minutes. The resulting solid was ground under ethanol, dissolved in boiling benzene, filtered from yellow grains and the solution was concentrated. It (5.0 g., 62.5%) formed glossy, pale green flakes, M. P. 204° C., from ethanol.

*Example 30.—1,3-di(6-methyl-2-pyridyl)-2-thiohydantoin*

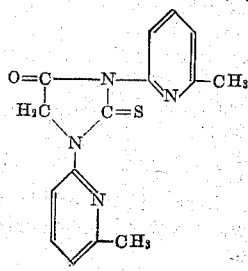

Ethyl N-(6-methyl-2-pyridyl)glycine (10 g.) and methyl N-(6-methyl-2-pyridyl)dithiocarbamate (10 g.) were fused together at 150–155° C. for 3 hours. The solid was broken up under ethanol and collected. It (11.85 g., 77%) was extracted with boiling ethanol (250 cc.) to leave 9.3 g. undissolved (A). The ethanol extract on concentration to 100 cc. gave 2.0 g. yellow flakes on chilling (B). (A) formed white crystals M. P. 219–221° C. from benzene and (B) yellow flakes, M. P. 189–190° C., from benzene. They both analyze correctly for the required substance.

*Example 31.—Triethylammonium N-(4-pyridyl)dithiocarbamate*

4-aminopyridine (4.8 g.) was dissolved in hot pyridine (30 cc.), cooled at 25° C. and carbon disulphide (3.3 cc.) and triethylamine (8 cc.) were added. After 3–4 hours, yellow crystals separated. After standing for 20 hours, ether (100 cc.) was added and the crystals collected and washed with cold ethanol. It (6.9 g., 51%) formed orange flakes, M. P. 141° C.

*Example 32.—Methyl N-(4-pyridyl)dithiocarbamate*

The product of Example 31 (13.5 g.), methanol (50 cc.) and methyl iodide (3.5 cc.) were warmed to dissolve and allowed to cool. After 1 hour, water (200 cc.) was added to give an oil which slowly crystallized. From a little ethanol it (6.8 g., 74%) formed pale yellow prisms, M. P. 142–144° C.

*Example 33.—3-ethyl-5-(3-ethylbenzoxazolin-2-ylidene-ethylidene)-1-(2-pyridyl)-2-thiohydantoin*

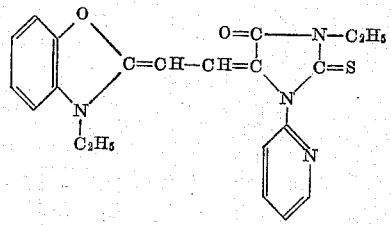

2-2'-acetanilidovinylbenzoxazole ethiodide (2.2 g.), 3-ethyl-1-(2-pyridyl)-2-thiohydantoin (1.1 g.), ethanol (10 cc.) and triethylamine (0.8 cc.) were refluxed together for 15 minutes on a steam bath. The dye was collected after chilling. Yield 1.15 g. (78.5%). It formed red needles, M. P. 216–217° C., from ethanol. It sensitized a silver iodobromide and a silver chlorobromide emulsion strongly with peaks at 550 mu.

*Example 34.—3-ethyl-5-(3 - methylthiazolidin-2 - ylidene-ethylidene)-1-(2-pyridyl)-2-thiohydantoin*

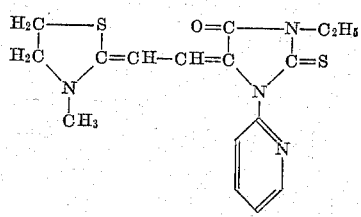

2-2'-acetanilidovinylthiazoline methiodide (3.9 g.), 3-ethyl-1-(2-pyridyl)-2-thiohydantoin (2.2 g.), ethanol (15 cc.) and triethylamine (1.5 cc.) were heated together for 15 minutes on a steam bath. Ethanol (10 cc.) was added, the solution cooled and scratched. The dye (1.35 g., 39%) formed rust needles, M. P. 180–182° C., after recrystallizing first from benzene-light petroleum and then from ethanol. It sensitized silver iodobromide and chlorobromide emulsions strongly with peaks at 530 mu.

*Example 35.—3-ethyl-5-(3-ethyl-4,5-diphenyloxazolin-2-ylidene-ethylidene)-1-(2-pyridyl)-2-thiohydantoin*

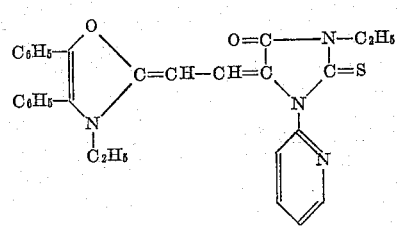

2-2'-anilinovinyl-4,5 - diphenyloxazole etho - p-toluenesulphonate (2.7 g.), 3-ethyl-1-(2-pyridyl)-2-thiohydantoin (1.1 g.), ethanol (15 cc.) and triethylamine (2.5 cc.) were heated on a steam bath until the alcohol boiled. Acetic anhydride (1 cc.) was added and the whole was refluxed for 5 minutes. After chilling overnight, the red crystals (1.8 g., 73%) were collected. They were recrystallized from benzene-light petroleum, then from ethanol and formed red needles, M. P. 235–237° C. It sensitized a silver chlorobromide or iodobromide emulsion with peaks at 560 mu.

*Example 36.—3-ethyl-5-(3-ethylnaphtho-2',1'-4,5-oxazolin-2-ylidene-ethylidene)-1-(2-pyridyl)-2-thiohydantoin*

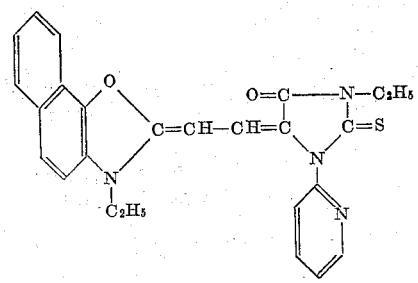

2 - 2' -acetanilidovinylnaphtho - 2',1' - 4,5 - oxazole ethiodide (2.4 g.), 3-ethyl-1-(2-pyridyl)-2-thiohydantoin (1.1 g.), pyridine (15 cc.) and triethylamine (0.8 cc.) were refluxed together for 30 minutes on a gauze. The solution was cooled and methanol (40 cc.) was added. After chilling overnight the dye separated. It was extracted with boiling benzene, the extracts were concentrated to 25 cc. and methanol (25 cc.) was added. The process was repeated to give 1.1 g. of garnet crystals, M. P. 242–243° C.

It sensitized silver chlorobromide and iodobromide emulsions strongly with peaks at 570 mu.

*Example 37.—3 - ethyl - 5 - (3 - ethylnaphtho - 1',2'-4,5 - oxazolin - 2 - ylidene - ethylidene) - 1 - (2-pyridyl)-2-thiohydantoin*

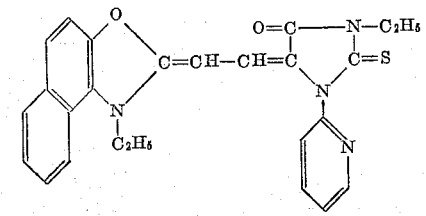

2 - 2' - acetanilidovinylnaphtho - 1',2' - 4,5 - oxazole-ethiodide (2.4 g.) was treated as in Example 36 to give 1.15 g. (52%) dye which formed orange-red needles, M. P. 176–177° C., from pyridinethanol. It sensitized silver chlorobromide or iodobromide emulsions strongly with peaks at 565 mu.

*Example 38.—3 - ethyl - 5 - (3 - methylbenzothiazolin - 2-ylidene)-1-(2-pyridyl)-2-thiohydantoin*

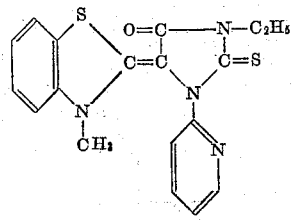

2 - methylthiobenzothiazole metho - p - toluenesulphonate (1.85 g.), 3-ethyl-1-(2-pyridyl)-2-thiohydantoin (1.1 g.), ethanol (10 cc.) and triethylamine (0.8 cc.) were refluxed together for 15 minutes. The dye separated rapidly. From benzene-light petroleum, then from ethanol it (1.55 g., 84%) formed soft, yellow flakes, m. p. 241° C. It sensitized a silver chloride emulsion strongly with a peak at 440 mu.

*Example 39.—3 - ethyl - 5 - (3 - ethylbenzothiazolin - 2-ylidene - but - 2' - enylidene) - 1 - (2 - pyridyl) - 2-thiohydantoin*

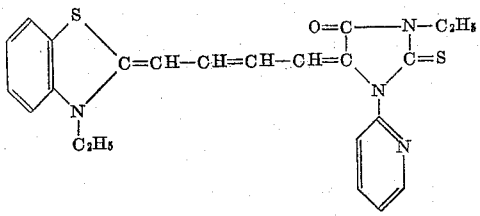

2-4'-acetanilidobuta-1',3'-dienylbenzothiazole ethiodide (2.4 g.), 3-ethyl-1-(2-pyridyl)-2-thiohydantoin (1.1 g.), ethanol (10 cc.) and triethylamine (0.8 cc.) were refluxed together for 15 minutes. The dye which separated on chilling was extracted with boiling benzene, the benzene extract was filtered and concentrated until crystallization set in. An equal volume of light petroleum was added to give 1.6 g. (73.5%) dye. It formed soft, blue needles, M. P. 243–245° C., from pyridine-ethanol.

It sensitized a silver iodobromide emulsion strongly with a peak at 685 mu and a silver chlorobromide with a peak at 690 mu.

*Example 40.—3 - ethyl - 5 - (3 - ethylnaphtho - 2',1'-4,5 - thiazolin - 2 - ylidene - but - 2'' - enylidene) - 1-(2-pyridyl)-2-thiohydantoin*

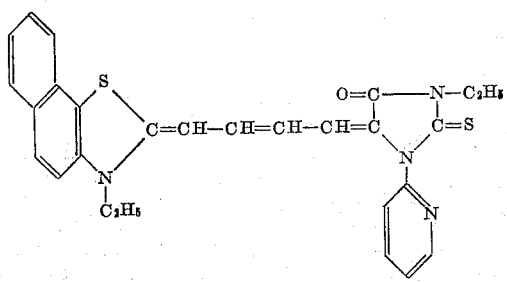

2 - 4'' - acetanilidobuta - 1'' - 3'' - dienylnaphtho - 2',1'-4,5-thiazole ethiodide (1.8 g.), 3-ethyl-1-(2-pyridyl)-2-thiohydantoin (0.8 g.), pyridine (5 cc.) and triethylamine (0.7 cc.) were refluxed on a gauze for 30 minutes. Methanol (30 cc.) was added, the mixture was chilled overnight and the dye collected. The latter was extracted with benzene, the extracts filtered, concentrated to 15 cc. and methanol (30 cc.) added. The dye (0.95 g., 54.5%) which crystallized formed glittering green flakes, M. P. 250–251° C., from benzene-ethanol.

It sensitized a silver chlorobromide strongly with a peak at 690 mu and a silver iodobromide emulsion with a peak at 685 mu.

*Example 41.—3 - ethyl - 5 - (3 - ethylnaphtho - 1',2' - 4,5-thiazolin - 2 - ylidene - but - 2" - enylidene) - 1 - (2-pyridyl)-2-thiohydantoin*

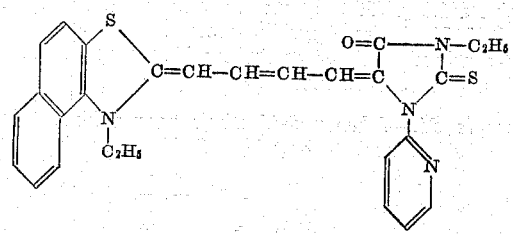

This was obtained in a manner similar to that of Example 40, in 37.4% yield as soft, green flakes, M. P. 252° C., from pyridine-ethanol.

It sensitized silver chlorobromide and iodobromide emulsions strongly with peaks at 690 mu.

*Example 42.—5 - (3 - ethylbenzoxazolin - 2 - ylidene-ethylidene) - 3 - n - heptyl - 1 - (2 - pyridyl) - 2-thiohydantoin*

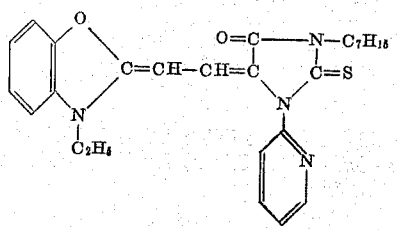

2-2'-acetanilidovinylbenzoxazole ethiodide (2.2 g.), 3-n-heptyl-1-(2-pyridyl)-2-thiohydantoin (1.5 g.), ethanol (10 cc.) and triethylamine (0.8 cc.) were refluxed together for 15 minutes. On chilling overnight, the dye slowly crystallized. It (1.45 g., 62%) formed soft orange needles, M. P. 120–121° C., from isopropanol.

It sensitized a silver iodobromide emulsion strongly with a peak at 540 mu and a silver chlorobromide emulsion with a peak at 550 mu.

*Example 43.—5 -(3 - ethylnaphtho - 2',1' - 4,5-oxazolin-2 - ylidene - ethylidene) - 3 - n - heptyl - 1-(2-pyridyl)-2-thiohydantoin*

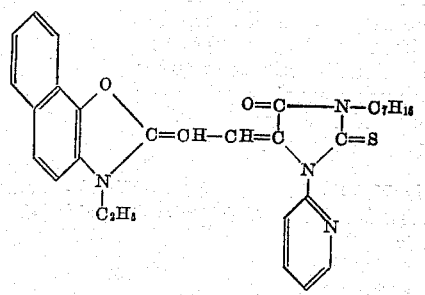

2 - 2' - acetanilidovinylnaphtho - 2',1' - 4,5 - oxazole ethiodide (2.4 g.), 3-heptyl-1-(2-pyridyl)-2-thiohydantoin (1.45 g.), pyridine (10 cc.) and triethylamine (1 cc.) were refluxed together on a gauze for 30 minutes. Ethanol (25 cc.), then water (25 cc.) were added to precipitate the dye as a tar which solidified on standing overnight. It was collected, air dried and extracted with benzene. The benzene was concentrated to 10 cc., ethanol (25 cc.) was added and the solution concentrated to 15 cc. The dye separated on chilling. It (1.7 g., 66.5%) formed soft red needles, M. P. 131–133° C., (soft at 105° C.) after recrystallization from benzene-ethanol, then from ethanol.

It sensitized a silver chlorobromide or iodobromide emulsion strongly with peaks at 570 mu.

*Example 44.—5 - (3 - ethylnaphtho - 1',2' - 4,5 - oxazolin-2 - ylidene - ethylidene) - 3 - n - heptyl-1-(2-pyridyl)-2-thiohydantoin*

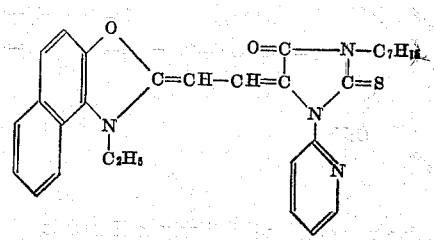

This dye was obtained in a similar manner to Example 43, in 56.5% yield as soft red needles, M. P. 136–138° C. from ethanol.

It sensitized silver chlorobromide or iodobromide emulsions strongly with peaks at 570 mu.

*Example 45.—5-(3-ethylbenzothiazolin-2-ylidene-but-2'-enylidene)-3-n-heptyl-1-(2-pyridyl)-2-thiohydantoin*

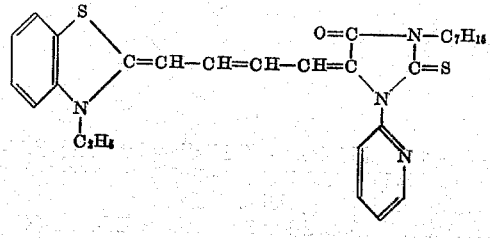

2-4'-acetanilidobuta-1',3'-dienylbenzothiazole ethiodide (2.4 g.), 3-n-heptyl-1-(2-pyridyl)-2-thiohydantoin (1.45 g.), pyridine (10 cc.) and triethylamine (0.8 cc.) were refluxed together for 30 minutes. Methanol (40 cc.) was added and the solution was chilled overnight. The dye (48% yield) formed blue needles, M. P. 149–151° C. from benzene-cyclohexane. It sensitized a silver chlorobromide emulsion strongly with a peak at 680 mu.

*Example 46.—5-(3-ethylnaphtho - 2',1'-4,5 - thiazolin-2-ylidene-but - 2"-enylidene)-3-n-heptyl-1-(2-pyridyl)-2-thiohydantoin*

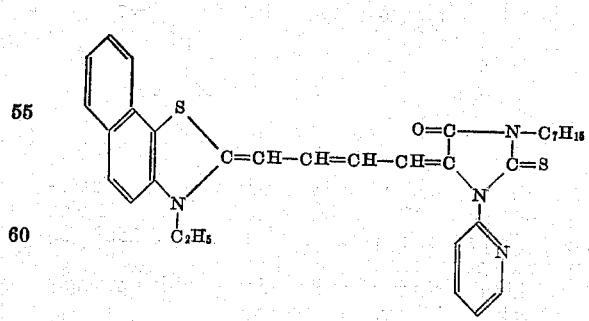

2-4'"-acetanilidobuta - 1'",3'" - dienylnaphtho - 2',1'-4,5-thiazole ethiodide (2.5 g.), 3-n-heptyl-1-(2-pyridyl)-2-thiohydantoin (1.45 g.), pyridine (10 cc.) and triethylamine (0.8 cc.) were refluxed on a gauze for 30 minutes and the dye precipitated by the addition of methanol (40 cc.). It was extracted with benzene, the benzene solution was concentrated to 25 cc. and the dye precipitated with light petroleum. From benzene-ethanol it (1.5 g., 54%) formed dull green threads, M. P. 224° C.

It sensitized a silver chlorobromide emulsion strongly with a peak at 700 mu.

*Example 47.*—*5 - (3 - ethylnaphtho - 1',2'-4,5-thiazolin-2-ylidene-but - 2" - enylidene)-3-n-heptyl-1-(2-pyridyl)-2 thiohydantoin*

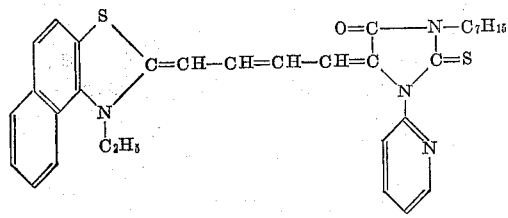

This dye was obtained similarly to Example 46, in 31% yield, as soft bronze threads, M. P. 161° C. from pyridine-methanol, the threads turned green on drying.

It sensitized a silver chlorobromide emulsion strongly with a peak at 710 mu.

*Example 48.*—*3 - allyl-5-(3-ethylnaphtho-1',2'-4,5-thiazolin-2-ylidene-but-2"-enylidene)-1-(2-pyridyl)-2-thiohydantoin*

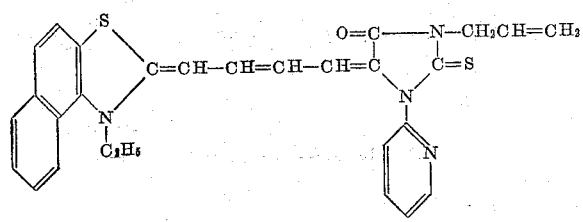

2 - 4" - acetanilidobuta - 1",3"-dienylnaphtho-1',2'-4,5-thiazole ethiodide (5.26 g.), 3-allyl-1-(2-pyridyl)-2-thiohydantoin (2.35 g.), pyridine (15 cc.) and triethylamine (1.5 cc.) were refluxed for 30 minutes. Ethanol (40 cc.) was added and the dye collected after chilling. It was extracted with benzene, the benzene extracts were concentrated and the dye was brought to crystallization by the addition of ethanol. It (0.8 g., 16.1%) formed soft green threads, M. P. 250° C., from pyridine-methanol.

It sensitized a silver chlorobromide emulsion strongly with a peak at 710 mu.

*Example 49.*—*5 - (3 - ethylnaphtho - 1',2'-4,5-thiazolin-2-ylidene-but - 2"-enylidene) - 3 - methyl-1-(2-pyridyl)-2-thiohydantoin*

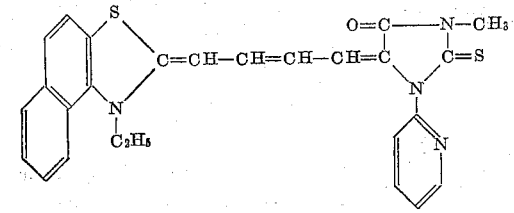

The dye was obtained as in Example 48 but using 3-methyl-1-(1-pyridyl)-2-thiohydantoin (2.1 g.). It (1.1 g., 23.4%) formed soft, green needles, M. P. 258° C., from pyridine-methanol.

It sensitized a silver chlorobromide emulsion strongly with a peak at 700 mu.

*Example 50.*—*5 - (3 - ethylnaphtho - 1',2'-4,5-thiazolin-2-ylidene - but - 2" - enylidene) - 3 - phenyl - 1 - (2-pyridyl)-2-thiohydantoin*

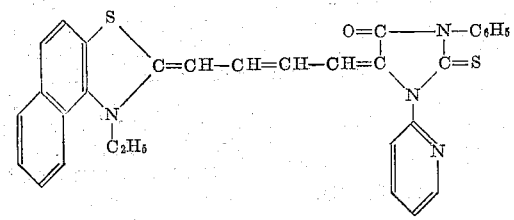

This dye was obtained as in Example 48 but using 3-phenyl-1-(2-pyridyl)-2-thiohydantoin (2.7 g.). The crude dye was extracted in a Soxhlet apparatus with xylene to give a 1.8 g. (33.8%) yield. It formed green threads, M. P. 268° C., from pyridine-methanol.

It sensitized a silver chlorobromide emulsion strongly with a peak at 710 mu.

*Example 51.*—*3-benzyl-5-(3-ethylbenzoxazolin-2-ylidene-ethylidene)-1-(2-pyridyl)-2-thiohydantoin*

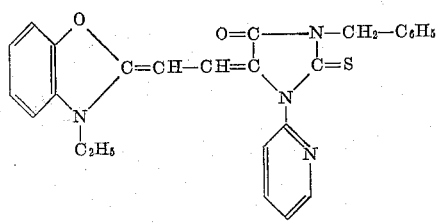

2-2'-acetanilidovinylbenzoxazole ethiodide (2.15 g.), 3-benzyl-1-(2-pyridyl)-2-thiohydantoin (1.4 g.), ethanol (15 cc.) and triethylamine (0.8 cc.) were refluxed together for 15 minutes. The dye was collected from the chilled solution. It (1.95 g., 85%) formed red needles, M. P. 214° C. from benzene ethanol. It sensitized a silver chlorobromide emulsion strongly with a peak at 550 mu.

*Example 52.*—*5 - (3 - ethylnaphtho - 2',1'-4,5-thiazolin-2-ylidene - but - 2"-enylidene)-1-n-heptyl-3-(2-pyridyl)-2-thiohydantoin*

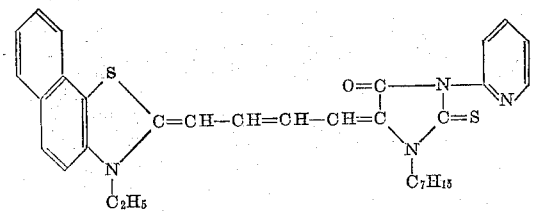

2 - 4" - acetanilidobuta - 1",3"-dienylnaphtho-2',1'-4,5-thiazole ethiodide (5.25 g.), 1-heptyl-3-(2-pyridyl)-2-thiohydantoin (2.9 g.), pyridine (15 cc.) and triethylamine (1.5 cc.) were refluxed for 30 minutes. Ethanol (25 cc.) and water (10 cc.) were run in and the mixture was chilled. The dye was collected and extracted with boiling benzene. The extract was concentrated to 15 cc. and hot ethanol (40 cc.) was run in. The dye (1.25 g., 20%) formed dark green crystals, M. P. 220–221° C., from benzene-ethanol.

It sensitized a silver chlorobromide emulsion strongly with a peak at 705 mu.

*Example 53.*—*5-(3-ethylnaphtho-2',1'-4,5 - oxazolin - 2-ylidene-ethylidene)-1-n-heptyl-3-(2-pyridyl)-2 - thiohydantoin*

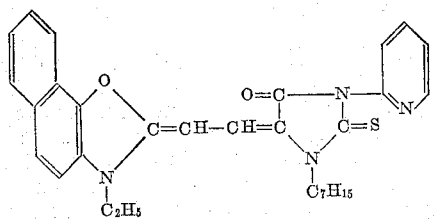

2 - 2" - acetanilidovinylnaphtho - 2',1' - 4,5 - oxazole ethiodide (4.85 g.), 1-n-heptyl-3-(2-pyridyl)-2-thiohydantoin (2.9 g.), pyridine (15 cc.) and triethylamine (1.5 cc.) were refluxed together for 30 minutes. Purified as in Example 52 it (1.8 g., 35%) formed magenta needles, M. P. 190–192° C., from benzene-ethanol.

It sensitized a silver chlorobromide emulsion strongly with a peak at 575 mu.

*Example 54.—5-(3-ethylbenzothiazolin-2-ylidene-but - 2'-enylidene)-1-n-heptyl-3-(2-pyridyl)-2-thiohydantoin*

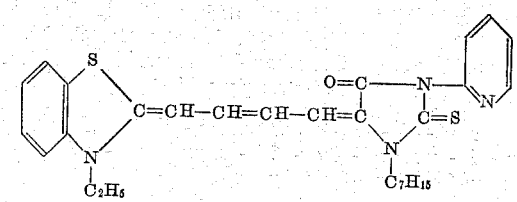

2-4'-acetanilidobuta-1',3'-dienylbenzothiazole ethiodide (4.76 g.), 1-heptyl-3-(2-pyridyl)-2-thiohydantoin, pyridine (20 cc.) and triethylamine were refluxed together for 30 minutes. The dye was isolated and purified as for Example 52. It (1.5 g., 30%) formed tiny brown needles, M. P. 180–182° C., from benzene-methanol.

It sensitized a silver chlorobromide emulsion strongly with a peak at 690 mu.

*Example 55.—5-(3-ethylnaphtho-1',2'-4,5 - thiazolin - 2-ylidene-but-2"-enylidene)-1-n-heptyl-3-(2 - pyridyl)-2-thiohydantoin*

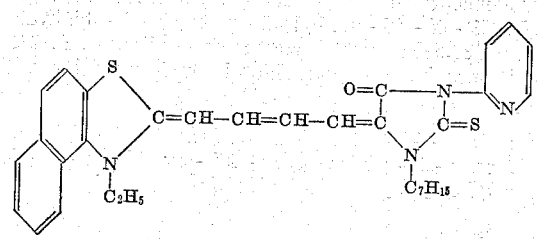

Was obtained 22% yield in a manner analogous to its isomer of Example 52 and formed soft green needles, M. P. 243° C., from benzene-ethanol.

It sensitized a silver chlorobromide emulsion strongly with a peak at 710 mu.

*Example 56.—5-(3-ethylnaphtho-2',1'-4,5 - thiazolin - 2-ylidene-but-2"-enylidene)-1-phenyl-3-(2 - pyridyl) - 2-thiohydantoin*

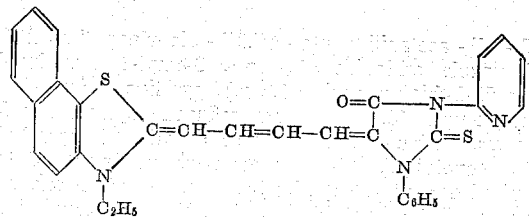

Was obtained similarly from 2,4"-acetanilidobuta-1", 3"-dienylnaphtho-2',1'-4,5-thiazole ethiodide (5.26 g.) and 1-phenyl-3-(2-pyridyl)-2-thiohydantoin (2.7 g.). The crude dye was extracted with benzene in a Soxhlet and obtained (1.8 g., 34%) as dull green threads, M. P. 261° C., from pyridine-methanol.

It sensitized a silver chlorobromide emulsion strongly with a peak at 710 mu.

*Example 57.—5-(3-ethylnaphtho-2',1'-4,5 - thiazolin - 2-ylidene - but - 2" - enylidene) - 1,3 - di - (2 - pyridyl)-2-thiohydantoin*

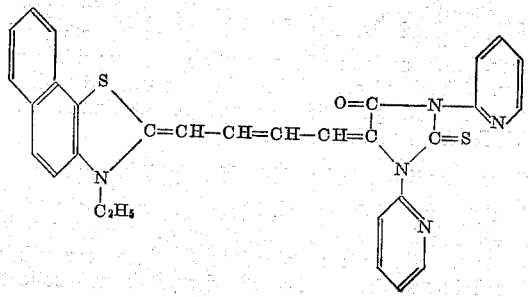

Was obtained similarly from 2-4"-acetanilidobuta-1", 3"-dienylnaphtho-2',1'-4,5-thiazole ethiodide (5.26 g.), 1,3-di-(2-pyridyl)-2-thiohydantoin (2.7 g.), pyridine (20 cc.) and triethylamine (1.5 cc.). It (2.1 g., 39%) formed glittering green flakes, or dark green threads, M. P. 269° C., from pyridine-methanol.

It sensitized a silver chlorobromide or iodobromide emulsion strongly with a peak at 700 mu.

*Example 58.—1-ethyl-5-(3-ethylnaphtho-2',1'-4,5 - thiazolin-2-ylidene-but-2"-enylidene)-3-(2 - pyridyl) - 2-thiohydantoin*

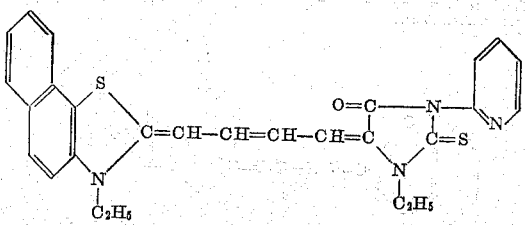

2-4"-acetanilidobuta-1",3"-dienylnaphtho - 2',1'-4,5-thiazole ethiodide (2.2 g.), 1-ethyl-3-(2-pyridyl)-2-thiohydantoin (0.9 g.), pyridine (10 cc.) and triethylamine (0.6 cc.) were refluxed together for 30 minutes, cooled and methanol (30 cc.) was run in. After chilling overnight the dye was collected, washed with methanol, dried and extracted with benzene. The benzene solution was evaporated and the dye (1.2 g., 31%) recrystallized from pyridine-methanol. It formed soft green threads, M. P. 259° C. It sensitized a silver iodobromide or chlorobromide emulsion strongly with $\lambda_{max}$. 700 mu.

*Example 59.—5-(3-ethylnaphtho-2',1'-4,5 - thiazolin - 2-ylidene-but-2"-enylidene)-1-(2-pyridyl)-3-(3 - pyridyl)-2-thiohydantoin*

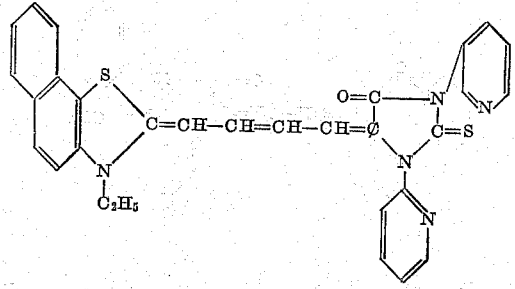

Obtained as for the dye of Example 57, but using 1-(2-pyridyl)-3-(3-pyridyl)-2-thiohydantoin, it formed soft, green needles, M. P. 275° C., in 43% yield.

It sensitized a silver chlorobromide emulsion strongly with $\lambda_{max}$. 695 mu.

*Example 60.—5-(3-ethylbenzoxazolin-2 - ylidene - ethylidene) - 1 - (2 - pyridyl) - 3 - (6 - methyl - 2 - pyridyl)-2-thiohydantoin*

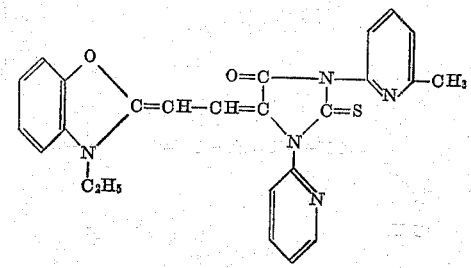

2-2'-acetanilidovinylbenzoxazole ethiodide (1.5 g.), 1-(2-pyridyl)-3-(6-methyl-2-pyridyl) - 2 - thiohydantoin (0.95 g.), ethanol (10 cc.) and triethylamine (0.6 cc.) were refluxed for 30 minutes. The dye crystallized slowly on chilling. It is a mixture of two dyes. It was dissolved in benzene (80 cc.) and concentrated to 40 cc. Dye A

(0.35 g.) crystallized on standing. The filtrate was concentrated to 20 cc., ethanol (20 cc.) was added and the solution concentrated to 20 cc. Dye B (0.75 g.) separated on standing. Dye A formed soft, pink flakes, M. P. 209° C., from pyridine-ethanol. Dye B was dissolved in (15 cc.) benzene to give deep orange needle rosettes, M. P. 155° C. (effervescence). It (A or B) sensitized a silver iodobromide emulsion strongly with a peak at 540 mu.

*Example 61.*—*5 - (3 - ethylbenzoxazolin - 2 - ylideneethylidene) - 1 - (2 - pyridyl) - 3 - (3 - quinolyl) - 2-thiohydantoin*

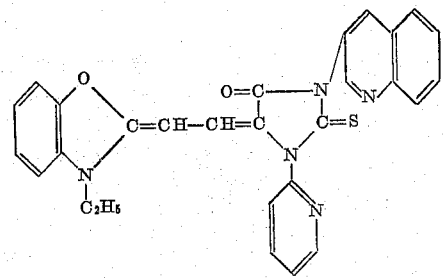

2-2'-acetanilidovinylbenzoxazole ethiodide (1.45 g.), 1 - (2 - pyridyl) - 3 - (3 - quinolyl) - 2 - thiohydantoin (1.1 g.), ethanol (25 cc.) and triethylamine (0.5 cc.) were refluxed for 15 minutes. The dye separated rapidly and it (2.25 g., 76%) formed soft, orange threads, M. P. 258° C., from pyridine-ethanol. It sensitized a silver iodobromide emulsion strongly with λmax. 540 mu.

*Example 62.*—*5 - (3 - ethylbenzoxazolin - 2 - ylideneethylidene) - 3 - (4 - methyl - 2 - pyridyl) - 1 - (2-pyridyl)-2-thiohydantoin*

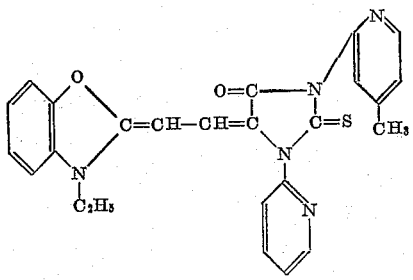

Obtained as the dye of Example 60 but using 1-(2-pyridyl) - 3 - (4 - methyl - 2 - pyridyl) - 2 - thiohydantoin, it (79% yield) formed hard orange needle rosettes from benzene, M. P. 110° C. (effervescence). It sensitized a silver iodobromide emulsion strongly with λmax. 540 mu.

*Example 63.*—*5 - (3 - ethylnaphtho - 2',1' - 4,5 - thiazolin - 2 - ylidene - but - 2'' - enylidene) - 3 - (4 - methyl-2-pyridyl)-1-(2-pyridyl)-2-thiohydantoin*

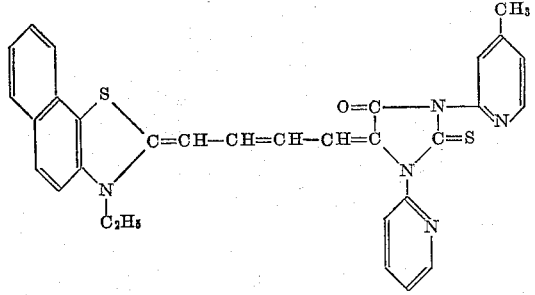

2 - 4'' - acetanilidobuta - 1'',3'' - dienylnaphtho - 2',1'- 4,5-thiazole ethiodide (2.6 g.), 3-(4-methyl-2-pyridyl)-1-(2-pyridyl)-2-thiohydantoin (1.42 g.), pyridine (20 cc.) and triethylamine (0.8 cc.) were refluxed for 30 minutes, cooled and methanol (50 cc.) and water (50 cc.) were added. The dye was collected after chilling overnight, air dried and extracted with benzene and the benzene solution was concentrated to 30 cc. The dye which separated (0.5 g.) formed green crystals M. P. 204° C., from pyridine-ethanol. It sensitized a silver chlorobromide emulsion strongly with λmax. 710 mu.

*Example 64.*—*5 - (3 - ethylnaphtho - 2',1' - 4,5 - thiazolin - 2 - ylidene - but - 2'' - enylidene) - 1,3 - di(6-methyl-2-pyridyl)-2-thiohydantoin*

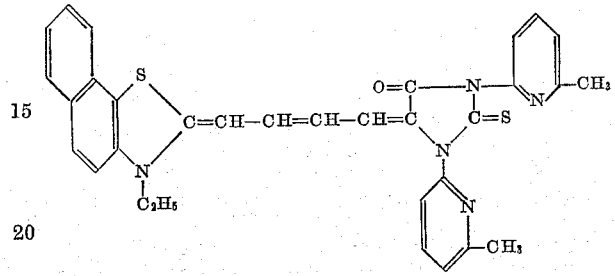

Obtained similarly to Example 63 from the higher M. P. 1,3 - di - (6 - methyl - 2 - pyridyl) - 2 - thiohydantoin, it (28.5%) formed dark green needles, M. P. 213° C. It sensitized a silver chlorobromide emulsion with λmax. 690 mu.

*Example 65.*—*3 - ethyl - 5 - (3 - ethylnaphtho - 2',1' - 4,5-thiazolin - 2 - ylidene - but - 2'' - enylidene) - 1 - (6-methyl-2-pyridyl)-2-thiohydantoin*

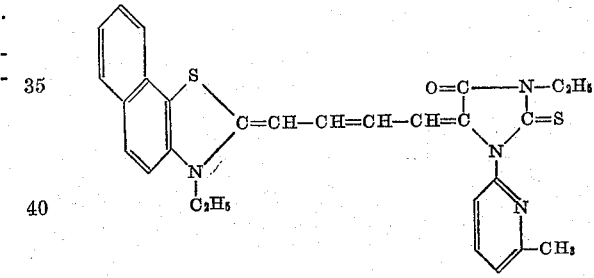

2 - 4'' - acetanilidobuta - 1'',3'' - dienylnaphtho - 2',1'- 4,5-thiazole ethiodide (2.7 g.), 3-ethyl-1-(6-methyl-2-pyridyl)-2-thiohydantoin (1.2 g.), pyridine (15 cc.) and triethylamine (0.8 cc.) were refluxed together for 30 minutes. Ethanol (75 cc.) was added and the whole chilled overnight. The crystals were air dried and the required dye extracted with benzene. The benzene was distilled off and the residue (0.75 g., 29.5%) recrystallized twice from pyridine-methanol. It formed green flakes, M. P. 262° C. (decomp.). It sensitized a silver chlorobromide emulsion strongly with λmax. 700 mu.

I have also found that dyes corresponding to those of Formula V above wherein either R₄ or R₅ represents a thiazyl group can be prepared and that these dyes likewise sensitize photographic silver halide emulsions. The following examples illustrate the preparation of the necessary intermediates and these new merocyanine dyes.

*Example 66.*—*Triethylammonium N - 2 - thiazolyldithiocarbamate*

2-aminothiazole (10.0 g.) was dissolved in pyridine (20 cc.), carbon disulphide (6.6 cc.) and triethylamine (16 cc.) were added and the solution was set aside for 48 hours. The hard crystalline cake was washed with ethanol. It (16.7 g., 60%) formed yellow flakes, M. P. 142° C., from methanol-ether.

*Example 67.*—*Methyl N-2-thiazolyldithiocarbamate*

The product of Example 66 (15.0 g.) was finely ground and warmed with methanol (150 cc.) and methyl iodide (3.5 cc.). The salt dissolved as the ester crystallized. After 2 hours, the thick meal of crystals was collected and washed with water, then ethanol. It (9.3 g., 90.5%) formed straw needles, M. P. 175–176° C., from ethanol.

*Example 68.—1-methyl-3-(2-thiazolyl)-2-thiohydantoin*

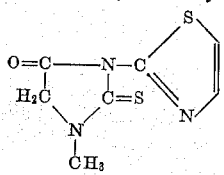

Potassium hydroxide (5.6 g.) was dissolved in water (25 cc.) and N-methylglycine hydrochloride (6.3 g.) was added. The product of Example 67 (9.5 g.) and ethanol (50 cc.) were added and the whole was refluxed on a steam bath for 20 hours. After cooling the solid was filtered off and discarded. The filtrate was acidified with acetic acid, the small amount of tar was removed and the liquor concentrated to 75 cc. On chilling a tar separated which slowly crystallized. It (1.9 g., 18%) formed pink needles, M. P. 133° C., from ethanol.

*Example 69.—1-ethyl-3-(2-thiazolyl)-2-thiohydantoin*

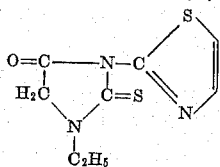

Proceeding as in Example 68 but using N-ethylglycine hydrochloride in equivalent amount, the product (28% yield) formed pink needles, M. P. 176–177° C., from ethanol.

*Example 70.—5 - (3 - ethylnaphtho - 2',1' - 4,5 - thiazolin - 2 - ylidene - but - 2" - enylidene) - 1 - methyl - 3 - (2-thiazolyl)-2-thiohydantoin*

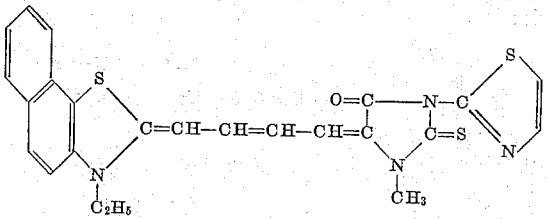

2 - 4' - acetanilidobutadienylnaphtho - 2',1' - 4,5 - thiazole ethiodide (2.7 g.), the product of Example 68 (1.05 g.), pyridine (15 cc.) and triethylamine (0.8 cc.) were refluxed together for ½ hour. Ethanol (50 cc.) was added and the blue solution chilled overnight. The dye was air dried and extracted in a Soxhlet apparatus with benzene. The solvent benzene was removed and the dye (1.25 g., 52.5%) recrystallized from pyridine-ethanol as dark green threads, M. P. 285° C.

As shown in a number of the above examples, the dyes of my invention are particularly useful in sensitizing photographic silver halide emulsions, serving to alter the sensitivity thereof in a most useful manner. Sensitization by means of my new dye is, of course, directed primarily to the ordinarily employed, gelatino-silver-halide, developing-out emulsions. The dyes are advantageously incorporated in the washed, finished emulsion and should, of course, be uniformly distributed throughout the emulsion. In the preparation of photographic emulsions containing my new dyes, it is only necessary to disperse the dyes in the emulsions. The methods of incorporating dyes in emulsion are simple and well known to those skilled in the art of emulsion making. It is convenient to add the dyes from solutions in appropriate solvents. The solvent must, of course, be compatible with the emulsion and substantially free from any deleterious effect on the light-sensitive materials. Methanol has proven satisfactory as a solvent for the majority of my new dyes.

The concentration of my new dyes in the emulsion can vary widely, i. e. from about 5 to about 100 mgs. per liter of flowable emulsion. The concentration of the dye will vary according to the type of light-sensitive material in the emulsion and according to the effects desired. The suitable and most economical concentration for any given emulsion will be apparent to those skilled in the art upon making the ordinary tests and observations customarily used in the art of emulsion making.

To prepare a gelatino-silver-halide emulsion sensitized with one of my new dyes, the following procedure is satisfactory: A quantity of the dye is dissolved in methyl alcohol or other suitable solvent and a volume of this solution (which may be diluted with water) containing from 5 to 100 mgs. of dye is slowly added to about 1000 cc. of a gelatino-silver-halide emulsion, with stirring. Stirring is continued until the dye is uniformly distributed throughout the emulsion. With most of my new dyes, 10 to 20 mgs. of dye per liter of emulsion suffices to produce the maximum sensitizing effect with the ordinary gelatino-silver bromide (including bromiodide) emulsions. With fine-grain emulsions, which include most of the ordinarily employed gelatino-silver-chloride emulsions, somewhat larger concentrations of dye may be necessary to secure the optimum sensitizing effect.

The above statements are only illustrative and are not to be understood as limiting my invention in any sense, as it will be apparent that my new dyes can be incorporated by other methods in many of the photographic silver halide emulsions customarily employed in the art. For instance, the dyes can be incorporated by bathing a plate or film upon which an emulsion has been coated, in the solution of the dye, in an appropriate solvent. Bathing methods, however, are not to be preferred ordinarily.

Photographic silver halide emulsions which can advantageously be sensitized by means of the new dyes of my invention comprise the customarily employed gelatino-silver-chloride, gelatino-silver-chlorobromide, gelatino-silver-bromide, and gelatino-silver-bromiodide developing-out emulsions.

Photographic silver halide emulsions, such as those listed above, containing the sensitizing dyes of my invention can also contain such addenda as chemical sensitizers, e. g., sulfur sensitizers (e. g., allyl thiocarbamide, thiourea, allylisothiocyanate, cystine, etc.), various gold compounds (e. g., potassium chloroaurate, auric trichloride, etc.) (see U. S. Patents 2,540,085; 2,597,856 and 2,597,915), various palladium compounds, such as palladium chloride (U. S. 2,540,086), potassium chloropalladate (U. S. 2,598,079), etc., or mixtures of such sensitizers; antifoggants, such as ammonium chloroplatinate (U. S. 2,566,245), ammonium chloroplatinite (U. S. 2,566,263), benzotriazole, nitrobenzimidazole, 5-nitroindazole, benzidine, mercaptans, etc. (see Mees—"The Theory of the Photographic Process," Macmillan Pub., page 460), or mixtures thereof; hardeners, such as formaldehyde (U. S. 1,763,533), chrome alum (U. S. 1,763,533), glyoxal (U. S. 1,870,354), dibroacrolein (Br. 406,750), etc.; color couplers, such as those described in U. S. Patent 2,423,730, Spence and Carroll U. S. Patent 2,640,776, etc.; or mixtures of such addenda. Dispersing agents for color couplers, such as those set forth in U. S. Patents 2,322,027 and 2,304,940, can also be employed in the above-described emulsions.

The accompanying drawing further illustrates my invention. Each figure is a diagrammatic reproduction of a spectrogram showing the sensitivity of an ordinary gelatino-silver-chlorobromide emulsion containing one of my sensitizing dyes. In Figure 1, the curve depicts the sensitivity of an ordinary gelatino-silver-chlorobromide emulsion containing 5 - (3 - ethylnaphtho - 2',1' - 4,5 - thiazolin - 2 - ylidene - buta - 2",4" - dienylidene) - 1 - n-heptyl-3-(2-pyridyl)-2-thiohydantoin. In Figure 2, the curve depicts the sensitivity of an ordinary gelatino-silver-chlorobromide emulsion containing 5-(3-ethylbenzothiazolin - 2 - ylidene - buta - 2',4' - dienylidene) - 1 - n-heptyl-3-(2-pyridyl)-2-thiohydantoin. In Figure 3, the curve depicts the sensitivity of an ordinary gelatino-silver-chlorobromide emulsion containing 5-(3-ethyl-naphtho - 2',1' - 4,5 - thiazolin - 2 - ylidene - buta - 2'',4'' - dienylidene) - 1 - phenyl - 3 - (2 - pyridyl) - 2-thiohydantoin. The sensitometric measurements for a somewhat similar gelatino-silver-chlorobromide emulsion for these dyes are given in Examples 46, 54 and 56, respectively.

What I claim as my invention and desire secured by Letters Patent of the United States is:

1. A photographic silver halide emulsion sensitized with a compound selected from those represented by the following general formula:

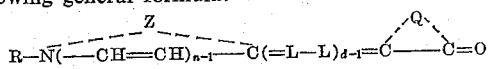

wherein R represents an alkyl group, $d$ represents a positive integer of from 1 to 3, $n$ represents a positive integer of from 1 to 2, L represents a methine group, Z represents the non-metallic atoms necessary to complete a heterocyclic nucleus containing from 5 to 6 atoms in the heterocyclic ring, and Q represents the non-metallic atoms necessary to complete a heterocyclic nucleus of the 2-thiohydantoin series, said heterocyclic nucleus of the 2-thiohydantoin series having a pyridyl or quinolyl substituent attached to at least one of the nitrogen atoms thereof.

2. A gelatino-silver-halide emulsion sensitized with a compound selected from those represented by the following general formula:

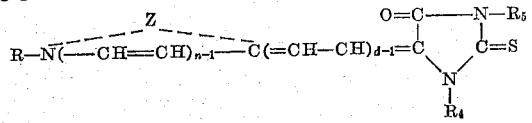

wherein R represents an alkyl group of the formula $C_mH_{2m+1}$ wherein $m$ represents a positive integer of from 1 to 4, $n$ represents a positive integer of from 1 to 2, $d$ represents a positive integer of from 1 to 3, Z represents the non-metallic atoms necessary to complete a heterocyclic nucleus selected from the group consisting of those of the thiazole series, those of the benzthiazole series, those of the naphthothiazole series, those of the thianaphtheno-7',6',4,5-thiazole series, those of the oxazole series, those of the benzoxazole series, those of the naphthoxazole series, those of the selenazole series, those of the benzselenazole series, those of the naphthoselenazole series, those of the thiazoline series, those of the 2-quinoline series, those of the 4-quinoline series, those of the 1-isoquinoline series, those of the 3,3-dialkylindolenine series, those of the 2-pyridine series and those of the 4-pyridine series, $R_4$ and $R_5$ each represents a member selected from the group consisting of an alkyl group containing from 1 to 7 carbon atoms, a mononuclear aromatic group of the benzene series, a pyridyl group, and a quinolyl group, at least one of the groups selected from the group consisting of $R_4$ and $R_5$ being a member selected from the group consisting of a pyridyl group and a quinolyl group.

3. A gelatino-silver-halide emulsion as defined in claim 2 wherein Z represents the non-metallic atoms necessary to complete a heterocyclic nucleus of the benzthiazole series.

4. A gelatino-silver-halide emulsion as defined in claim 2 wherein Z represents the non-metallic atoms necessary to complete a heterocyclic nucleus of the benzoxazole series.

5. A gelatino-silver-halide emulsion as defined in claim 2 wherein Z represents the non-metallic atoms necessary to complete a heterocyclic nucleus of the naphthothiazole series.

6. A gelatino-silver-halide emulsion as defined in claim 2 wherein Z represents the non-metallic atoms necessary to complete a heterocyclic nucleus of the naphthoxazole series.

7. A gelatino-silver-halide emulsion as defined in claim 2 wherein Z represents the non-metallic atoms necessary to complete a heterocyclic nucleus of the thiazoline series.

8. A photographic gelatino-silver-halide emulsion sensitized with a compound represented by the following formula:

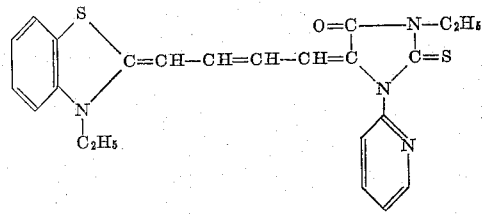

9. A photographic gelatin-silver-halide emulsion sensitized with a compound represented by the following formula:

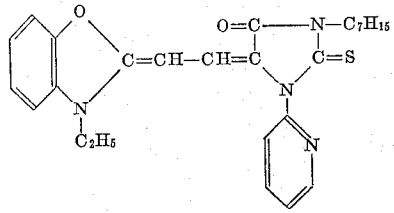

10. A photographic gelatino-silver-halide emulsion sensitized with a compound represented by the following formula:

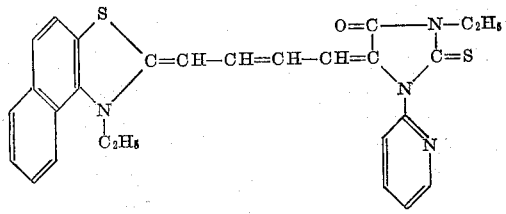

11. A photographic gelatino-silver-halide emulsion sensitized with a compound represented by the following formula:

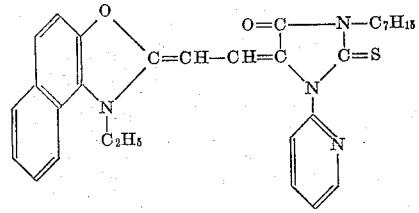

12. A photographic gelatino-silver-halide emulsion sensitized with a compound represented by the following formula:

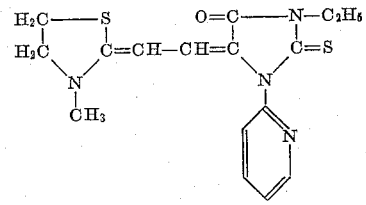

(References on following page)

References Cited in the file of this patent

UNITED STATES PATENTS

| | | |
|---|---|---|
| 2,166,736 | White et al. | July 18, 1939 |
| 2,263,749 | White et al. | Nov. 25, 1941 |
| 2,320,654 | Riester | June 1, 1943 |
| 2,322,015 | Hamer et al. | June 15, 1943 |
| 2,338,782 | Riester | Jan. 11, 1944 |
| 2,340,882 | Kendall | Feb. 8, 1944 |
| 2,353,164 | Kendall et al. | July 11, 1944 |

OTHER REFERENCES

Chemical Abstracts 16:3101. (Copy in S. L.) Abstract of Brit. Med. Journal, 1922, I, 514–515.

Chemical Abstracts 19:530. (Copy in S. L.) Abstract of Proc. Roy. Soc. London, 96B, 317–333, 1924.